(12) United States Patent
Florit et al.

(10) Patent No.: US 11,201,921 B2
(45) Date of Patent: Dec. 14, 2021

(54) VIRTUAL DEVICES IN INTERNET OF THINGS (IOT) NODES

(71) Applicant: Cisco Technology, Inc., San Jose, CA (US)

(72) Inventors: Lionel Florit, Greenbrae, CA (US); William Mark Townsley, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 48 days.

(21) Appl. No.: 16/682,699

(22) Filed: Nov. 13, 2019

(65) Prior Publication Data

US 2020/0366737 A1 Nov. 19, 2020

Related U.S. Application Data (60) Provisional application No. 62/847,237, filed on May 13, 2019.

(51) Int. Cl.
| | |
|---|---|
| *H04L 29/08* | (2006.01) |
| *H04W 4/70* | (2018.01) |
| *H04L 12/24* | (2006.01) |
| *H04L 29/06* | (2006.01) |
| *H04L 12/751* | (2013.01) |
| *H04W 4/18* | (2009.01) |

(52) U.S. Cl.
CPC .............. *H04L 67/12* (2013.01); *H04L 41/12* (2013.01); *H04L 45/02* (2013.01); *H04L 63/20* (2013.01); *H04L 67/10* (2013.01); *H04W 4/18* (2013.01); *H04W 4/70* (2018.02)

(58) Field of Classification Search
CPC ..... H04L 67/12; H04L 41/145; H04L 41/046; H04L 41/12; H04L 45/02; H04W 4/70
See application file for complete search history.

(56) References Cited

U.S. PATENT DOCUMENTS

| | | | |
|---|---|---|---|
| 9,396,015 | B2 | 7/2016 | Sundaresan et al. |
| 10,110,710 | B2 | 10/2018 | Cook et al. |
| 2017/0064045 | A1 | 3/2017 | Pai et al. |
| 2018/0024537 | A1 | 1/2018 | Chauvet et al. |
| 2019/0306242 | A1* | 10/2019 | Thummalapalli ... H04L 41/5003 |
| 2020/0295994 | A1* | 9/2020 | Shurtleff ................. H04L 41/06 |

OTHER PUBLICATIONS

Alam et al., "IOT Virtualization: A Survey of Software Definition & Function Virtualization Techniques for Internet of Things," arXiv, Feb. 28, 2019, pp. 11-30.

* cited by examiner

*Primary Examiner* — Glenford J Madamba
(74) *Attorney, Agent, or Firm* — Polsinelli PC (57) ABSTRACT

Systems, methods, and computer-readable for managing an Internet of Things (IoT) network include identifying an IoT device which is not connected to one or more communication layers of a IoT network, where the IoT network includes one or more intermediate nodes for connecting an IoT application to the IoT device. A virtual device is provided in at least one communication layer of at least one intermediate node, where the virtual device is used for modeling behavior of the IoT device. Using the virtual device as a proxy for the IoT device, operations at the at least one intermediate node while the IoT device is not connected to the at least one layer. The operations can include Operations, Administration, and Maintenance (OAM) functions. The virtual device can be withdrawn or disabled in the at least one intermediate node upon the IoT device establishing connection to the at least one layer.

17 Claims, 7 Drawing Sheets

500 →

IDENTIFY AN INTERNET OF THINGS (IoT) DEVICE WHICH IS NOT CONNECTED TO ONE OR MORE COMMUNICATION LAYERS OF A IoT NETWORK, THE IoT NETWORK COMPRISING ONE OR MORE INTERMEDIATE NODES FOR CONNECTING AN IoT APPLICATION TO THE IoT DEVICE
502

↓

INSTANTIATE A VIRTUAL DEVICE IN AT LEAST ONE COMMUNICATION LAYER OF AT LEAST ONE INTERMEDIATE NODE, THE VIRTUAL DEVICE FOR MODELING BEHAVIOR OF THE IoT DEVICE
504

↓

PERFORM OPERATIONS AT THE AT LEAST ONE INTERMEDIATE NODE USING THE VIRTUAL DEVICE AS A PROXY FOR THE IoT DEVICE WHILE THE IoT DEVICE IS NOT CONNECTED TO THE AT LEAST ONE LAYER.
506

IDENTIFY AN INTERNET OF THINGS (IOT) DEVICE WHICH IS NOT CONNECTED TO ONE OR MORE COMMUNICATION LAYERS OF A IOT NETWORK, THE IOT NETWORK COMPRISING ONE OR MORE INTERMEDIATE NODES FOR CONNECTING AN IOT APPLICATION TO THE IOT DEVICE
502

INSTANTIATE A VIRTUAL DEVICE IN AT LEAST ONE COMMUNICATION LAYER OF AT LEAST ONE INTERMEDIATE NODE, THE VIRTUAL DEVICE FOR MODELING BEHAVIOR OF THE IOT DEVICE
504

PERFORM OPERATIONS AT THE AT LEAST ONE INTERMEDIATE NODE USING THE VIRTUAL DEVICE AS A PROXY FOR THE IOT DEVICE WHILE THE IOT DEVICE IS NOT CONNECTED TO THE AT LEAST ONE LAYER.
506

VIRTUAL DEVICES IN INTERNET OF THINGS (IOT) NODES

CROSS-REFERENCES TO RELATED APPLICATIONS

This application claims the benefit of U.S. Provisional Application No. 62/847,237, filed May 13, 2019, which is hereby incorporated by reference, in its entirety and for all purposes.

TECHNICAL FIELD

The subject matter of this disclosure relates in general to the field of Internet of Things (IoT) Operations, Administration, and Maintenance (OAM). More specifically, example aspects are directed to the use of virtual devices in IoT nodes for OAM of IoT devices.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

Market trends, related to home improvement, for example, are driving development for new "smart" services, including consolidation by service providers marketing 'N' play (e.g., data, voice, video, security, energy management, etc.) and expanding home networks. Some applications for IoT include smart homes and buildings capable of having centralized control over virtually any device or appliance in the home or office.

As such, increasing development in IoT technologies will lead to numerous IoT devices surrounding a user at home, in vehicles, at work, and many other locations. For example, hundreds of consumer IoT devices, such as, appliances, TVs, light fixtures, air conditioners, music systems, garage door, home security system, fans, sprinkler system, microwave oven, oven, dishwasher, clothes washer and dryer, etc., may be configured as IoT device. Similarly, in an industrial setting, various machines, drones, robots, user equipment, computing systems, actuators, etc., can be controlled through IoT techniques. The use of IoT technology is known and ever expanding in various environments.

However, there are some challenges with respect to the management and deployment of IoT devices. For example, there is a lack of reliable infrastructure for determining and analyzing messages in an IoT network (e.g., messages to/from IoT devices, corresponding gateways, controllers, or other nodes). There is also a lack of reliable techniques for identifying the path travelled by messages generated by specific sensors or devices connected to an IoT network, for determining activity/inactivity of IoT devices, for determining network and transit performance of IoT traffic, for determining failure nodes in multi-hop transit paths in an IoT network, etc. Thus there is a need for improved Operations, Administration, and Maintenance (OAM) solutions to address these challenges and provide platforms for monitoring network conditions and device status in IoT deployments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As previously mentioned, there is a need for improved solutions to address the challenges in Operations, Administration, and Maintenance (OAM) of networks with connected devices, such as Internet of Things (IoT) networks. In example aspects of this disclosure, a component, referred to as a "virtual device" is created in an intermediate node of multi-hop network such as an IoT network. In some examples, the intermediate node in which the virtual device can be utilized can include an IoT gateway. The virtual device can correspond to an end device or IoT device which may be deployed in the IoT network but may not be presently connected to the IoT network. For example, the IoT device may be offline or may not have been on-boarded for a connection to be established in one or more layers of the IoT network (e.g., the IoT device may not have been connected in an applications layer). The virtual device may include a software module executing in the IoT gateway. In some examples, a separate virtual device may be provided in each layer in which the IoT device is expected to establish connection. In each layer where a virtual device is provided in the IoT gateway, the virtual device may act as a digital twin or proxy of an instantiated IoT device while the IoT device is offline, e.g., during boot up or until the IoT device establishes connection in that layer.

For example, an IoT device newly deployed in an IoT network may have been powered on and have even established connections to an IoT gateway on one or more of the 7 layer multi-hop network stack such as a layer 1 (physical layer), layer 2 (data link layer), etc., all the way to a layer 6 (presentation layer) but not yet have established a layer 7 (application layer) connection to the IoT gateway. For this IoT device which does not have an application layer connection established, a virtual device may be provided in the IoT gateway for the IoT device. The virtual device can operate like or mimic the behavior of the IoT device from an OAM perspective. For instance, the virtual device may respond to status pings on the application layer from a cloud backend device or a fog node to convey that the corresponding IoT device is present or connected to the IoT network even though the IoT device may not yet have connected to the IoT network on the application layer. This way, several OAM functions can be executed in advance before the IoT device establishes connection, thus providing early diagnostics and network operations in a time and cost effective manner.

Disclosed herein are systems, methods, and computer-readable media for the creation and use of virtual devices in IoT networks. In some examples, the virtual device allows network staging without the presence of all IoT devices. For example, the network connection to the IoT device can be staged using the virtual device in the application layer in a manner where connections to IoT device in the lower layers can be established with the virtual device acting as a proxy in the application layer until the IoT device connection in the application layer is subsequently established. Upon the IoT device connection in the application layer being established, the virtual device can be withdrawn or disabled. Thus, the virtual device can support OAM functions in a temporary manner in one or more network layers. These functions of the virtual device can be performed in any other layer of the network stack as well and need not be limited to the use of the virtual device in the application layer Accordingly, virtual devices in intermediate network nodes such as the IoT gateway can be utilized in any network layer to verify and expedite end-to-end operations in a multi-hop IoT network.

In some examples, a method is provided. The method includes identifying an Internet of Things (IoT) device which is not connected to one or more communication layers of a IoT network, the IoT network comprising one or more intermediate nodes for connecting an IoT application to the IoT device; instantiating a virtual device in at least one communication layer of at least one intermediate node, the virtual device for modeling behavior of the IoT device; and performing operations at the at least one intermediate node using the virtual device as a proxy for the IoT device while the IoT device is not connected to the at least one layer.

In some examples, a system is provided. The system, comprises one or more processors; and a non-transitory computer-readable storage medium containing instructions which, when executed on the one or more processors, cause the one or more processors to perform operations including: identifying an Internet of Things (IoT) device which is not connected to one or more communication layers of a IoT network, the IoT network comprising one or more intermediate nodes for connecting an IoT application to the IoT device; instantiating a virtual device in at least one communication layer of at least one intermediate node, the virtual device for modeling behavior of the IoT device; and performing operations at the at least one intermediate node using the virtual device as a proxy for the IoT device while the IoT device is not connected to the at least one layer.

In some examples, a non-transitory machine-readable storage medium is provided, including instructions configured to cause a data processing apparatus to perform operations including: identifying an Internet of Things (IoT) device which is not connected to one or more communication layers of a IoT network, the IoT network comprising one or more intermediate nodes for connecting an IoT application to the IoT device; instantiating a virtual device in at least one communication layer of at least one intermediate node, the virtual device for modeling behavior of the IoT device; and performing operations at the at least one intermediate node using the virtual device as a proxy for the IoT device while the IoT device is not connected to the at least one layer.

In some examples of the methods, systems, and non-transitory machine-readable storage media, the at least one communication layer comprises an applications layer.

In some examples of the methods, systems, and non-transitory machine-readable storage media, the at least one intermediate node comprises an IoT gateway configured to connect directly with the IoT device in the at least one communication layer.

In some examples of the methods, systems, and non-transitory machine-readable storage media, the operations comprise one or more Operations, Administration, and Maintenance (OAM) functions.

In some examples of the methods, systems, and non-transitory machine-readable storage media, identifying the IoT device comprises discovering the IoT device being connected to the at least one intermediate node in one or more lower communications layers of the IoT network.

In some examples of the methods, systems, and non-transitory machine-readable storage media, performing the operations at the at least one intermediate node using the virtual device comprises expediting an on-boarding process for the IoT device in the at least one layer upon the IoT device establishing connection to the at least one layer.

Some examples of the methods, systems, and non-transitory machine-readable storage media, further comprise withdrawing or disabling the virtual device in the at least one intermediate node upon the IoT device establishing connection to the at least one intermediate node in the at least one layer.

This overview is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DESCRIPTION OF EXAMPLE EMBODIMENTS

Disclosed herein are systems, methods, and computer-readable media for schemes for cognitive sensor fusion management. In some examples, virtual devices are provided at one or more nodes of multi-hop network such as an IoT network. In some examples, an intermediate node in which a virtual device can be provisioned can include an IoT gateway. The virtual device can correspond to an end device or IoT device which may be deployed in the IoT network but may not be presently connected to the IoT network. For example, the IoT device may be offline or may not have been on-boarded for a connection to be established in one or more layers of the IoT network (e.g., the IoT device may not have been connected in an applications layer). The virtual device may include a software module executing in the IoT gateway. In some examples, a separate virtual device may be provided in each layer in which the IoT device is expected to establish connection. In each layer where a virtual device is provided in the IoT gateway, the virtual device may act as a digital twin or proxy of an instantiated IoT device while the IoT device is offline, e.g., during boot up or until the IoT device establishes connection in that layer.

Figure 1:
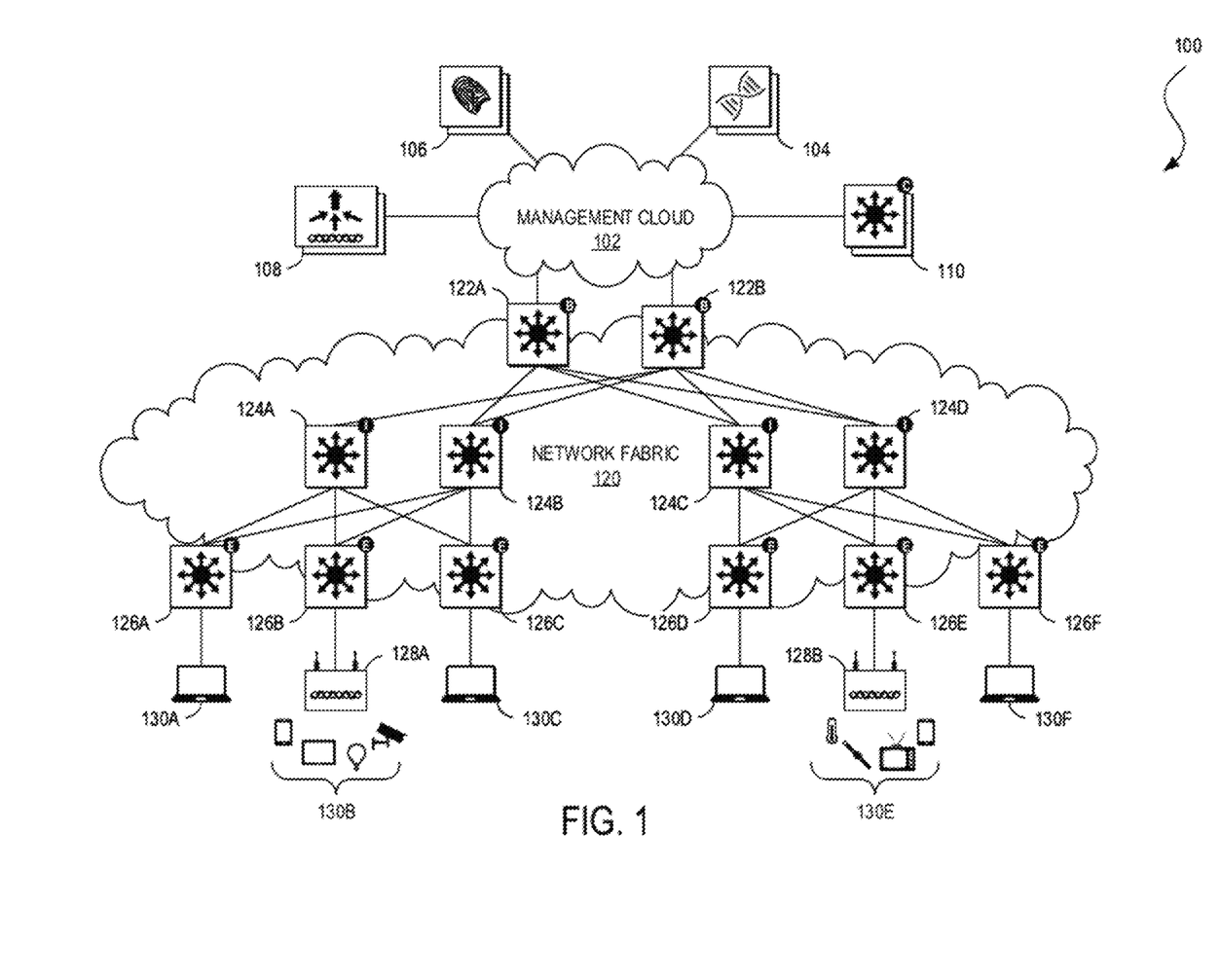
FIG. 1 illustrates a topology of an enterprise network in accordance with some examples.

FIG. 1 illustrates an example of a physical topology of a network 100 which may be configured according to aspects of this disclosure. In one example, the network 100 may provide intent-based networking in an enterprise network. It should be understood that, for the network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the network 100 can include any number or type of resources, which can be accessed and utilized by endpoints or network devices. The illustrations and examples provided herein are for clarity and simplicity.

In this example, the network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. In some examples, the endpoints 130 can include various Internet-connected devices which can be deployed in the computing devices. For example, the endpoints 130 can include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow. In some examples, a logical architecture for the network 100 can be implemented to include functions related to management, control, network fabric, physical layer, and shared services for the network 100.

Figure 2:
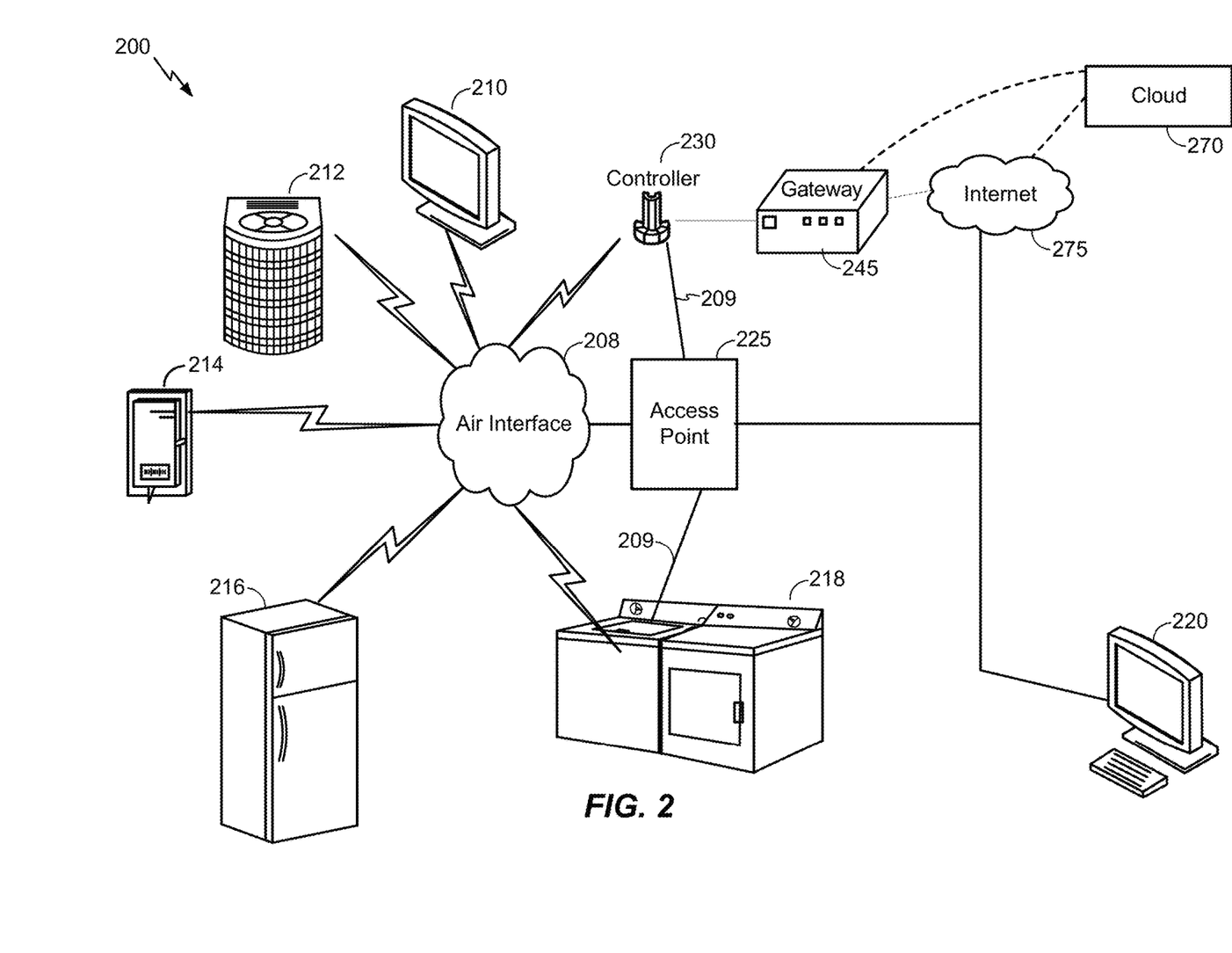
FIG. 2 illustrates an IoT network which can be configured to include virtual devices, in accordance with some examples.

FIG. 2 illustrates an example topology of a network 200 which may be configured to include one or more virtual devices according to aspects of this disclosure. In some aspects, the network 200 can be implemented using the network fabric, management, and/or architecture described with reference to the network 100 of FIG. 1. In some examples, the network 200 can include or support IoT interconnections and traffic.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. In some examples, an IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. In some examples, references may be made more generally to "connected devices", which can include devices such as IoT devices or other devices which can connect to a network and whose operations can be controlled remotely over the network.

In some aspects, the network 200 can support wireless communications among a plurality of plurality of IoT devices, which can include a television 210, an air conditioning (AC) unit 212, a thermostat 214, a refrigerator 216, a washer and dryer 218, and other endpoint devices. The IoT devices 210-218 can communicate with an access point 225 (e.g., such as a WLC 108) over an air interface 208 and/or direct wired connection 209. The air interface 208 can comply with a wireless Internet protocol (IP), such as IEEE 802.11. Internet 275 includes a number of routing agents and processing agents (not shown in FIG. 2 for the sake of convenience) and can include a global system of interconnected computers and computer networks that uses a standard Internet protocol suite (e.g., the Transmission Control Protocol (TCP) and IP) to communicate among disparate devices/networks.

Figure 3:
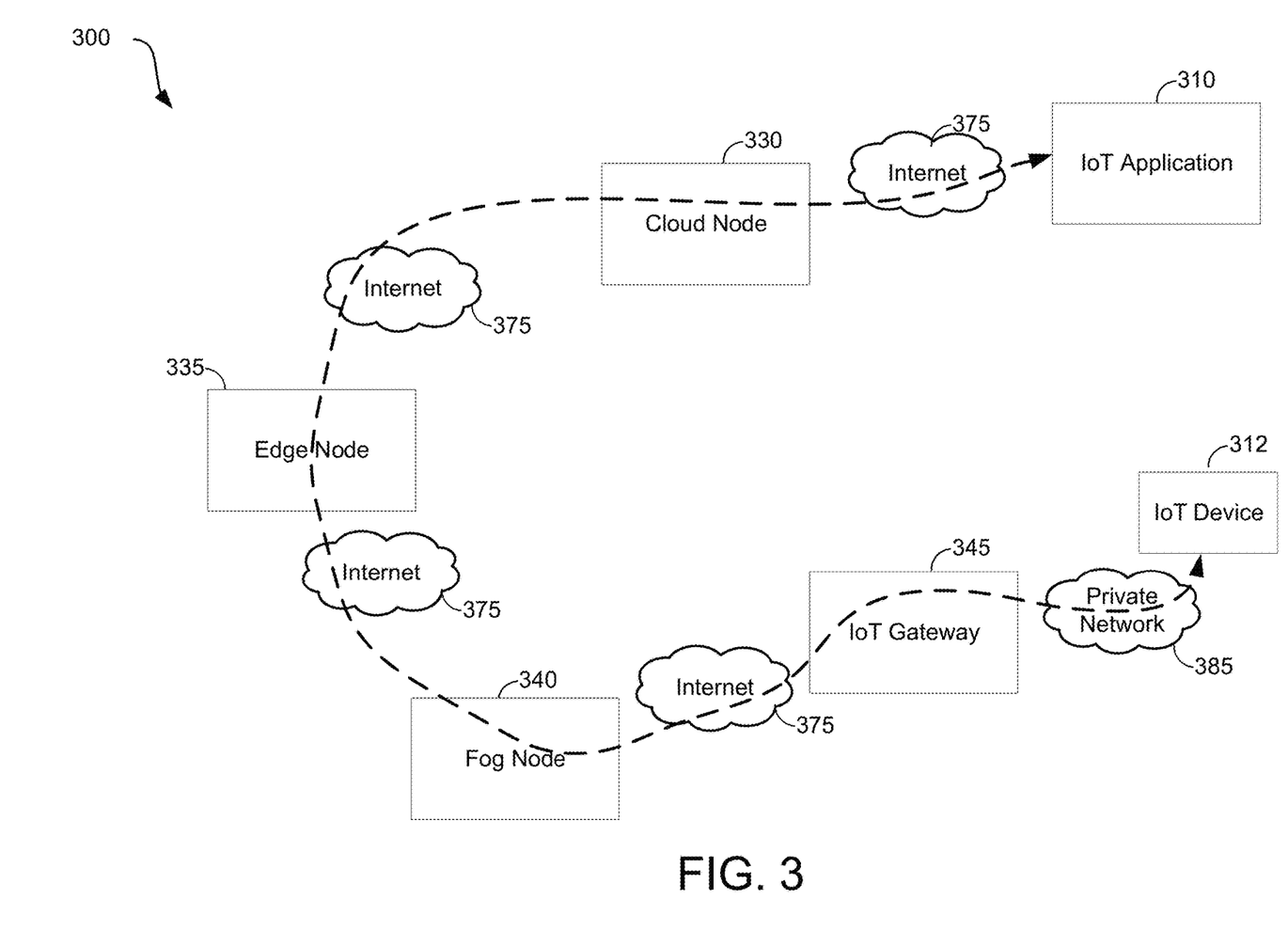
FIG. 3 illustrates a multi-hop communication path in an IoT network, in accordance with some examples.

In example aspects, remote access to the IoT devices 210-218 may be enabled through the Internet 275 through the use of one or more nodes in a multi-hop connection. For example, the one or more nodes can include an intermediate node such as an IoT gateway 245. FIG. 3 illustrates various other nodes such as a fog node, cloud based components, and others which may also be other intermediate nodes in a multi-hop connection between an IoT application and the IoT devices 210-218. In some aspects, the controller 230 can generally represent one or more other nodes. In some examples, the controller 230 can observe, monitor, control, or otherwise manage the various other components in the network 200. For example, the controller 230 can communicate with the access point 225 over the air interface 208 and/or direct wired connection 209 to interact with the IoT devices 210-218, where such interactions can include monitoring or managing attributes, activities, or other states associated with the various IoT devices 210-218.

A computer 220, such as a desktop or personal computer (PC), is shown as connecting to Internet 275 directly (e.g., over an Ethernet connection or Wi-Fi or 802.11-based network). The computer 220 may alternatively, or additionally, have a wired connection to Internet 275 or the computer 220 may be connected directly to the access point 225. Although illustrated as a desktop computer, the computer 220 may be a laptop computer, a tablet computer, a PDA, a smart phone, or the like. In some examples, the computer 220 can include a cloud computing system or a system of two or more computers acting in coordination. In some examples, the computer 220 may be used to implement one or more sensor fusion management techniques for fusing data obtained from the IoT devices 210-218. In some examples, a monitoring system (e.g., similar to a management cloud 102 of FIG. 2) can also be connected to the computer 220 or to the network 200 through the Internet 275. Cloud 270 can be include one or more cloud computing devices which can be configured according to the network 100 of FIG. 1.

As the number of IoT devices and applications which can use these devices increase, it becomes more important and more challenging to monitor IoT networks and obtain useful information. For example, the following may be important information to be tracked in an IoT network: any potential loss in IoT messages; path followed by messages generated by a particular IoT device or transmitted to an IoT device; analysis on whether inactivity or lack of messages from an IoT device can indicate a problem; which IoT devices have been active in a specific period of time; average network transmit time for messages to/from the IoT devices; messages exchanged between specific end-points or multi-hop connection paths; identification of potentially redundancies, transit performance, network delay, etc., within the network; and various other such information.

In some examples, various aspects of performance and troubleshooting can be performed by embedding customized agents (e.g., hardware and/or software agents) within the IoT devices and router. Such agents can be configured to enhance visibility in the IoT network by exposing the inner workings of an IoT application and providing information on messages sent by particular IoT devices, their paths traveled, potential message losses, etc. In some examples, the agents can also improve performance by obtaining periodic measures of key performance indicators (e.g., loss, jitter, throughput, etc.). In some examples, troubleshooting operations can be performed using the agents to identify where messages may be lost, capture and display the content of specific messages of interest transiting on the IoT network. In some examples, the agents can also provide analytics based on characterizing expected or normal operating conditions for the IoT devices. Further, some agents can be configured to provide alerts to a system administrator on any unexpected network behavior, losses, etc.

According to various examples, a virtual agent provided in an IoT network node can implement one or more of the above functions for the embedded agents. For example, a multi-hop connection between an IoT application executed on the computer 220 (e.g., to control one or more of the IoT devices 210-218) can involve one or more nodes in an IoT message chain. For example, an end-to-end communication path between an IoT Application and one or more of the IoT devices 210-218 can include one or more cloud components, fog nodes, and the IoT gateway 245. FIG. 3 illustrates an example of such a communication path in a multi-hop communication.

FIG. 3 illustrates an example network 300 which can be utilized for IoT communication between an IoT application 210 and an IoT device 312. In this instance, the IoT Application can include programs and functions for controlling a "smart" or IoT appliance 312. The IoT appliance 312 can include any of the IoT devices 210-218 or other IoT device which may be remotely operated and have the ability to perform functions and communicate using IoT technology. Internet 375 shows a general medium which enables end-to-end communication, which can include or cooperate with a private network 385. As shown, there may be a cloud node 330, an edge node 335, a fog node 340, and an IoT gateway 345 in the communication path. In some examples, the process of bringing in the IoT appliance 312 into the communication path can include an on-boarding process. For example, once the IoT appliance 312 is powered on or enabled for communication with the Internet 375 or private network 385, the on-boarding process can include a discovery process where the IoT appliance 312 may be discovered by the network 300, one or more processes for security and identification for authentication of the IoT appliance 312, exchange of one or more test messages to ensure the end-to-end connectivity, and various other processes which may be employed for specific communication mechanisms and protocols which may be involved. In this on-boarding process, there may be numerous points of failure or errors in the communication path. In some examples, the on-boarding process can be time consuming and can incur several road blocks if errors are discovered. Thus, even though the IoT appliance 312 can be operational and capable of connecting to the network in a seamless manner, problems can be encountered in any hop or leg of the communication path between the IoT application 310 and the IoT appliance 312. However, the on-boarding process can be significantly expedited by using the virtual devices according to this disclosure.

Figure 4:
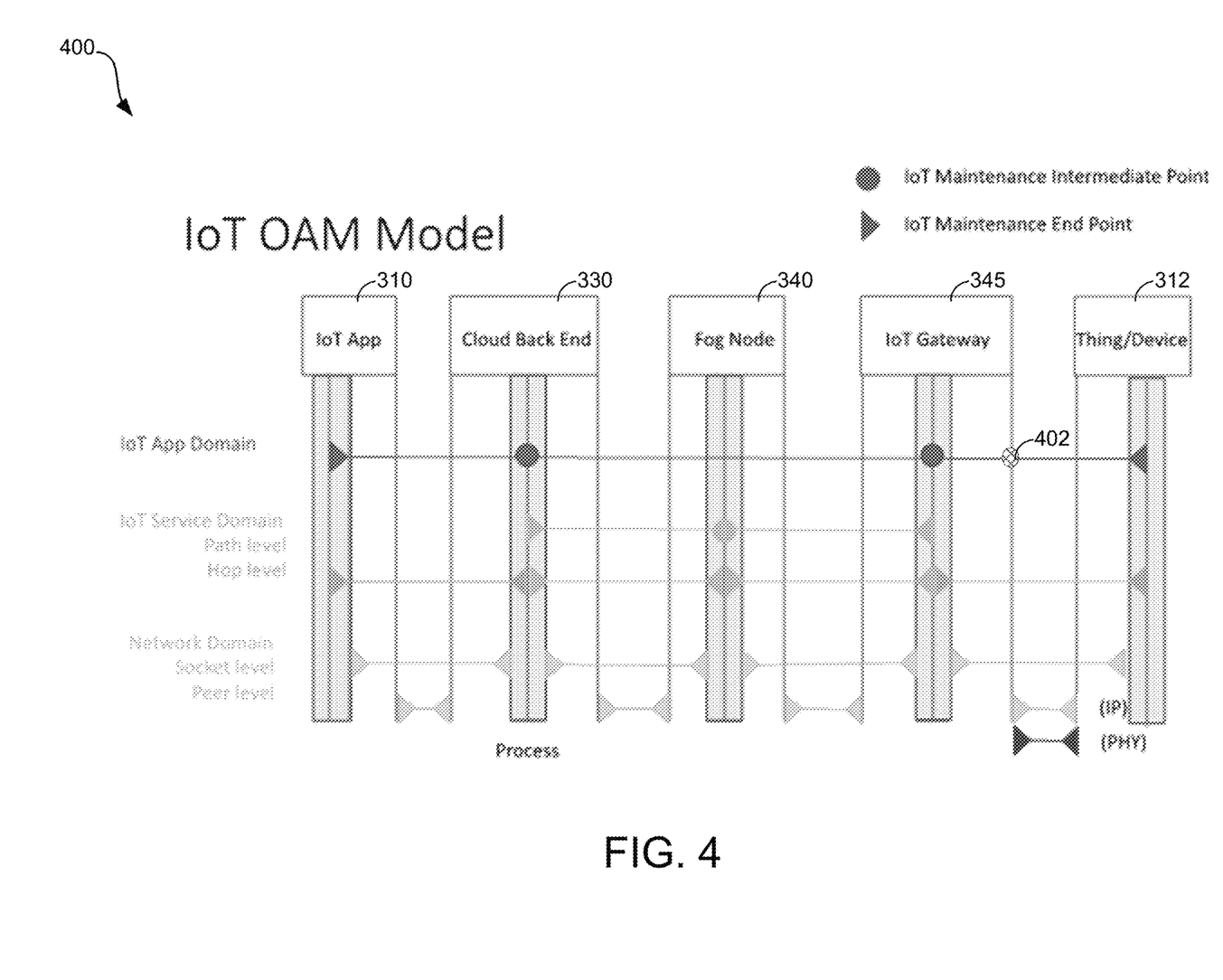
FIG. 4 illustrates communication layers in a communication path of an IoT network, in accordance with some examples.

FIG. 4 illustrates a simplified schematic view 400 of the communication path between the IoT application 310 and the IoT appliance 312 discussed with reference to FIG. 3. Also shown are example implementations of a multi-layer (e.g., 7-layer communication protocol) underlying the communication path. Specifically, the IoT application 310, the cloud node 330, the fog node 340, the IoT gateway 345, and the IoT appliance 312 are illustrated. Some applications may require the connections between the IoT application 310 and the IoT appliance 312 to be established on all layers for enabling the full feature set of IoT communication between these end nodes. For example, the IoT device 312 may need to establish connections to various nodes in the layer 1 (physical layer), layer 2 (data link layer), proceeding to the layer 6 (presentation layer) and layer 7 (application layer). The layer 7 or application layer connection may be finally established by completing the connection between the IoT gateway 345 and the IoT device 312.

In some examples, the virtual device 402 can be embedded in the IoT gateway 345 to mimic the behavior of the IoT device 312 until the layer 7 connection can be established and the IoT device 312 is successfully on-boarded. For example, the virtual device 402 can be configured as a software module on the IoT gateway 345 like the IoT device from an OAM perspective. In some examples, the virtual device 402 can include a one-to-one correspondence with a particular IoT device, and several such virtual devices can be created for each IoT device that the IoT gateway 345 is connected to, or as needed.

For instance, the virtual device can include a software module configured to receive status pings directed to the IoT device 312 on the applications layer (shown as "IoT App Domain" in FIG. 4) at the IoT gateway 345 from any of the other nodes such as the IoT Application 310 or the cloud node 330. The software module can generate a response on behalf of the IoT device 312. For example, the response can convey that the IoT device 312 is present and ready to communicate in the applications layer even though the IoT device 312 may still be offline. This way the virtual device 402 can complete several on-boarding steps for the IoT device 312. The on-boarding process for the IoT device 312 may proceed in parallel in the background, such that when the IoT device 312 is fully connected to the IoT gateway 345, the virtual device 402 may be withdrawn or disabled and the IoT device 312 can take over the OAM operations. As can be appreciated, the virtual device 402 can complete several critical steps on behalf of the IoT device 312 by acting as a proxy of the IoT device 312 such that the time taken for the IoT device 312 itself to perform these steps can be saved.

In some examples, the IoT gateway 345 may be configured to instantiate or deploy the virtual device 402 upon the IoT device 312 having established connection to the IoT gateway 345 in one or more lower layers (e.g., the physical layer). For example, in anticipation of the IoT device 312 shortly attempting to connect to the IoT gateway 345 in the application layer, the IoT gateway 345 may deploy the virtual device 402 such that the virtual device 402 may stand in as the proxy of the IoT device 312 until the IoT device 312 establishes connection in the application layer. The IoT gateway 345 may instantiate the virtual device 402 with characteristics and metrics based on knowledge about the IoT device 312 gained during the lower layer connections being established. For example, once the IoT device 312 is powered on and connects in one or more lower layers, the IoT gateway 345 can obtain information on the type of device, operation performed, brand, version, connection mechanism, etc. pertaining to the IoT device 312 and use this information in formulating the type of software module that would most accurately correspond to the IoT device 312. In some examples, the IoT gateway 345 may maintain a database or library of various software modules for known IoT devices and update the library as newer IoT devices establish connections with the IoT gateway 345. The IoT gateway 345 may consult the library using information gained during the lower layer connection processes with the IoT device 312 to determine the specific virtual device 402 to be used for the IoT device 312.

In some examples, if the IoT device 312 is offline for any other reason known to the IoT gateway 345, the IoT gateway 345 can initiate the virtual device 402 as needed. For example, once the IoT device 312 has been on-boarded and has been initially connected to the IoT gateway 345, the IoT device 312 may suffer connectivity loss or power loss. During this time if there are OAM operations for which it may be beneficial to provide a response on behalf of the IoT device 312 rather than stall such operations while the IoT device 312 is offline, the IoT gateway 345 may employ the virtual device 402 to act as the proxy of the IoT device 312.

In some examples, the above functionality described with reference to the IoT gateway 345 can also be incorporated on any other intermediate node such as the fog node 340 without departing from the scope of this disclosure. Similarly, a virtual device similar to the virtual device 402 can be established in any lower layer such as the layer 6 or presentation layer to perform similar functions as described above with respect to mimicking behavior of the IoT device 312 in the application layer.

Figure 5:
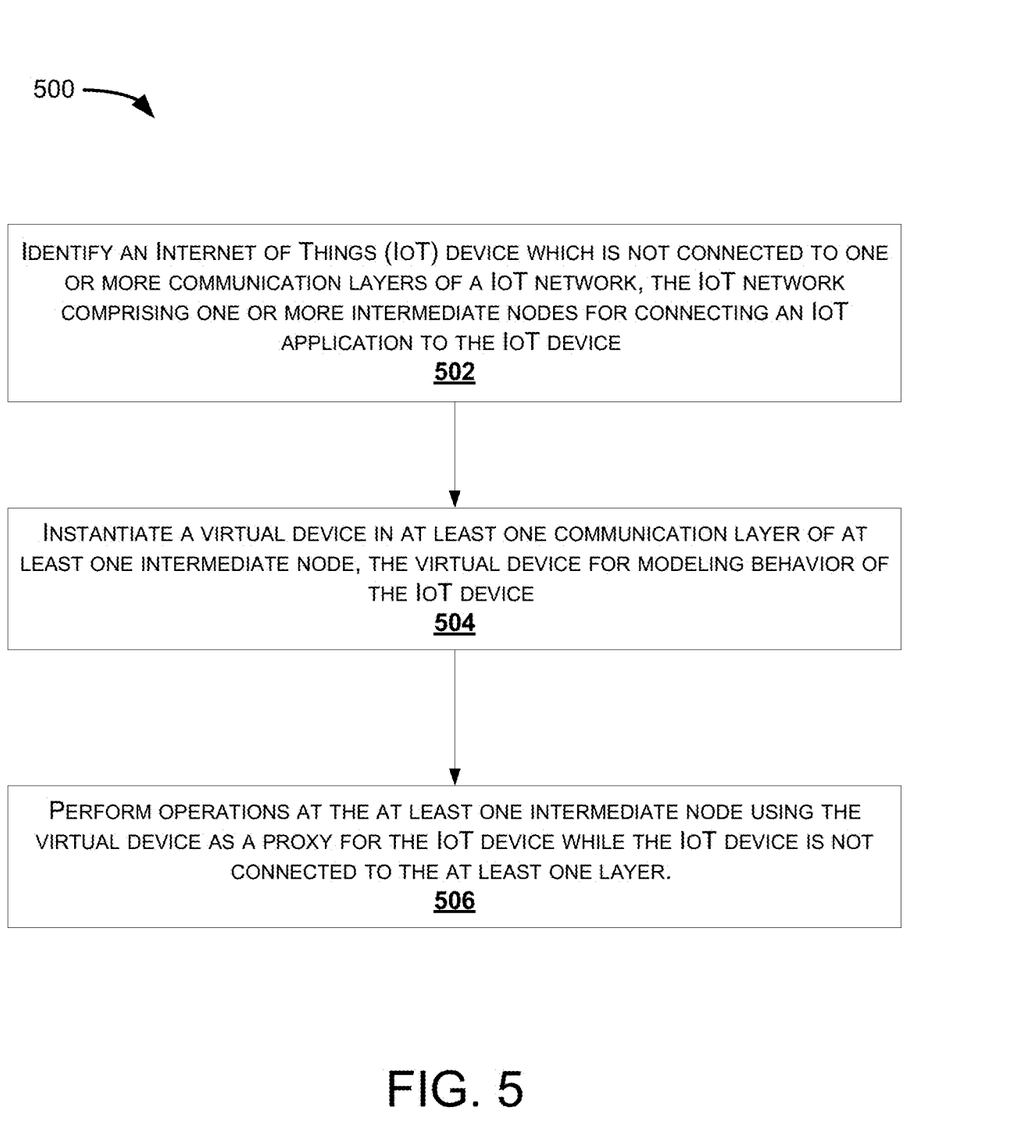
FIG. 5 illustrates a process for managing an IoT network using virtual devices, in accordance with some examples.

FIG. 5 illustrates a process 500 for managing an IoT network according to example aspects. For example, the process 500 can be implemented in the IoT network 300.

At step 502, the process 500 can include identifying an Internet of Things (IoT) device which is not connected to one or more communication layers of a IoT network, the IoT network comprising one or more intermediate nodes for connecting an IoT application to the IoT device. For example, an IoT device 312 can be identified for connecting to the application layer of the IoT network 300, where the IoT network can include a multi-hop network with one or more intermediate nodes such as the cloud node 330, the fog node 340, and the IoT gateway 345 between the IoT application 310 and the IoT device 312. In some examples, identifying the IoT device can be based on discovering the IoT device 312 being connected to the at least one intermediate node (e.g., the IoT gateway 345) in one or more lower communications layers of the IoT network 300 (e.g., in one or more of the layers 1-6).

At step 504, the process 500 can include instantiating a virtual device in at least one communication layer of at least one intermediate node, the virtual device for modeling behavior of the IoT device. For example, the virtual device 402 can be instantiated in the IoT gateway 345 for modeling behavior of the IoT device 312, where the IoT gateway 345 may be configured to connect directly with the IoT device 312 in the application layer, e.g., once the IoT device 312 has been on-boarded.

At step 506, the process 500 includes performing operations at the at least one intermediate node using the virtual device as a proxy for the IoT device while the IoT device is not connected to the at least one layer. For example, the operations can include one or more Operations, Administration, and Maintenance (OAM) functions. In an example, the virtual device 402 can receive and respond to status pings on behalf of the IoT device 312 while the IoT device 312 remains unconnected to the applications layer. In some examples, such operations performed at the intermediate node such as the IoT gateway 345 using the virtual device can expedite an on-boarding process for the IoT device 312 in at least the applications layer once the IoT device 312 establishes connection to the at least one layer. In some examples, the virtual device 402 can be withdrawn or disabled in the IoT gateway 345 upon the IoT device 312 establishing connection to the IoT gateway 345 in the applications layer.

Figure 6:
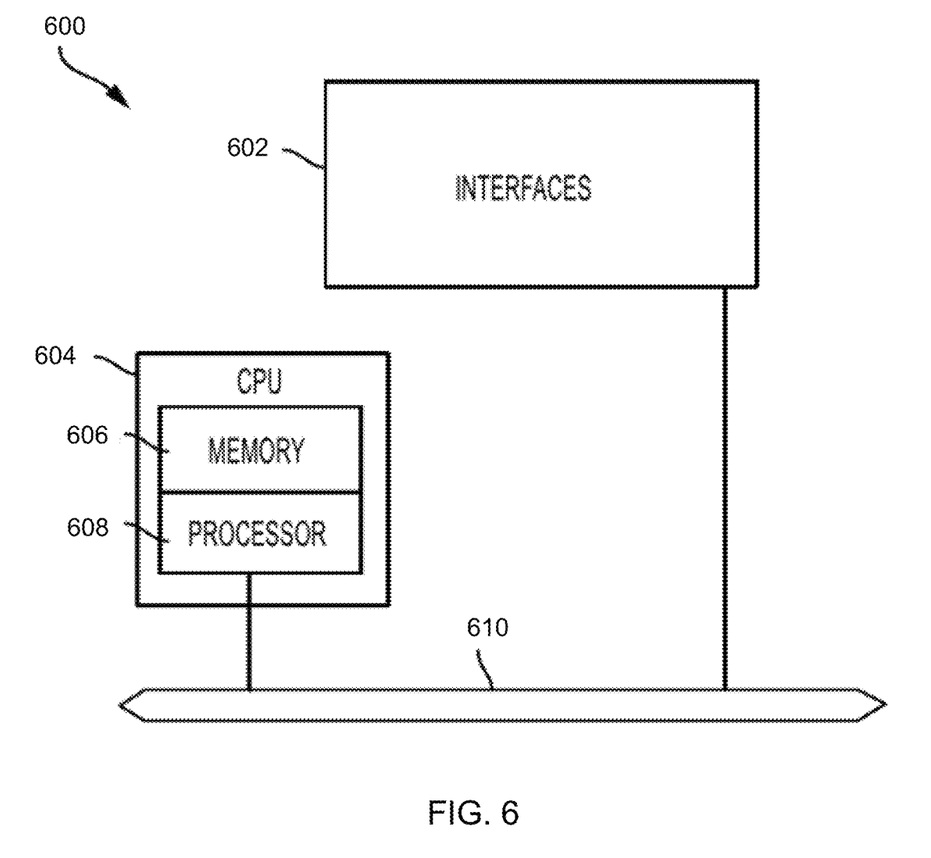
FIG. 6 illustrates an example network device in accordance with some examples.

FIG. 6 illustrates an example network device 600 suitable for implementing the aspects according to this disclosure. In some examples, the one or more IoT devices 210-218 and/or the intermediate nodes such as the IoT gateway 345, the fog node 340, the cloud node 330, etc., may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 1108 can be specially designed hardware for controlling the operations of the network device 600. In some cases, a memory 1106 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 04 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
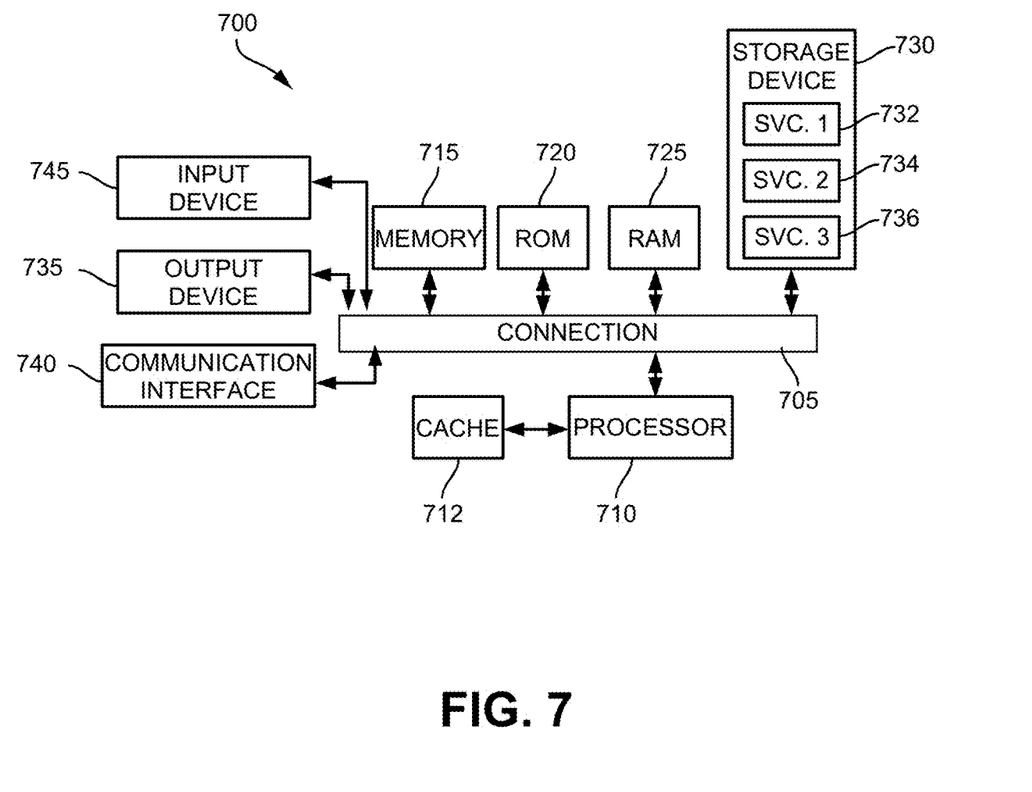
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3

736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   identifying an Internet of Things (IoT) device which is not connected to one or more communication layers of an IoT network, the IoT network comprising one or more intermediate nodes for connecting an IoT application to the IoT device;
   instantiating at a gateway node, in response to detecting a connection with the IOT device at a physical layer of the gateway node, a virtual device in at least one communication layer of the gateway node, the virtual device for modeling behavior of the IoT device;
   performing operations at the gateway node using the virtual device as a proxy for the IoT device before the IoT device connects to an application layer of the gateway node; and
   discontinuing using the virtual device as a proxy in response to the IOT device connecting to the application layer of the gateway node.

2. The method of claim 1, wherein the at least one communication layer comprises an applications layer.

3. The method of claim 1, wherein the at least one intermediate node comprises an IoT gateway configured to connect directly with the IoT device in the at least one communication layer.

4. The method of claim 1, wherein the operations comprise one or more Operations, Administration, and Maintenance (OAM) functions.

5. The method of claim 1, wherein performing the operations at the at least one intermediate node using the virtual device comprises expediting an on-boarding process for the IoT device in the at least one layer upon the IoT device establishing connection to the at least one layer.

6. The method of claim 1, further comprising withdrawing or disabling the virtual device in the at least one intermediate node upon the IoT device establishing connection to the at least one intermediate node in the at least one layer.

7. A system, comprising:
one or more processors; and
a non-transitory computer-readable storage medium containing instructions which, when executed on the one or more processors, cause the one or more processors to perform operations including:
identifying an Internet of Things (IoT) device which is not connected to one or more communication layers of an IoT network, the IoT network comprising one or more intermediate nodes for connecting an IoT application to the IoT device;
instantiating at a gateway node, in response to detecting a connection with the IOT device at a physical layer of the gateway node, a virtual device in at least one communication layer of the gateway node, the virtual device for modeling behavior of the IoT device; and
performing operations at the gateway node using the virtual device as a proxy for the IoT device before the IoT device connects to an application layer of the gateway node; and
discontinuing using the virtual device as a proxy in response to the IOT device connecting to the application layer of the gateway node.

8. The system of claim 7, wherein the at least one communication layer comprises an applications layer.

9. The system of claim 7, wherein the at least one intermediate node comprises an IoT gateway configured to connect directly with the IoT device in the at least one communication layer.

10. The system of claim 7, wherein the operations comprise one or more Operations, Administration, and Maintenance (OAM) functions.

11. The system of claim 7, wherein performing the operations at the at least one intermediate node using the virtual device comprises expediting an on-boarding process for the IoT device in the at least one layer upon the IoT device establishing connection to the at least one intermediate node in the at least one layer.

12. The system of claim 7, further comprising withdrawing or disabling the virtual device in the at least one intermediate node upon the IoT device establishing connection to the at least one layer.

13. A non-transitory machine-readable storage medium, including instructions configured to cause a data processing apparatus to perform operations including:
identifying an Internet of Things (IoT) device which is not connected to one or more communication layers of an IoT network, the IoT network comprising one or more intermediate nodes for connecting an IoT application to the IoT device;
instantiating at a gateway node, in response to detecting a connection with the IOT device at a physical layer of the gateway nod, a virtual device in at least one communication layer of the gateway node, the virtual device for modeling behavior of the IoT device; and
performing operations at the gateway node using the virtual device as a proxy for the IoT device before the IoT device connects to an application layer of the gateway node; and
discontinuing using the virtual device as a proxy in response to the IOT device connecting to the application layer of the gateway node.

14. The non-transitory machine-readable storage medium of claim 13, wherein the at least one communication layer comprises an applications layer.

15. The non-transitory machine-readable storage medium of claim 13, wherein the at least one intermediate node comprises an IoT gateway configured to connect directly with the IoT device in the at least one communication layer.

16. The non-transitory machine-readable storage medium of claim 13, wherein the operations comprise one or more Operations, Administration, and Maintenance (OAM) functions.

17. The non-transitory machine-readable storage medium of claim 13, wherein performing the operations at the at least one intermediate node using the virtual device comprises expediting an on-boarding process for the IoT device in the at least one layer upon the IoT device establishing connection to the at least one intermediate node in the at least one layer.

* * * * *